United States Patent [19] [11] 4,021,904

Constant [45] May 10, 1977

[54] ASSEMBLY AND METHOD FOR DRIVING AND WITHDRAWING DISC BRAKE PISTON

[76] Inventor: Guy R. Constant, 146-32 224 St., Rosedale, N.Y. 11422

[22] Filed: May 25, 1976

[21] Appl. No.: 689,742

[52] U.S. Cl. .................................... 29/263; 29/258

[51] Int. Cl.² .......................................... B23P 19/04

[58] Field of Search ............ 29/257, 263, 256, 258, 29/259

[56] References Cited

UNITED STATES PATENTS

| | | | |
|---|---|---|---|
| 664,565 | 12/1900 | Livingood | 29/259 |
| 1,440,992 | 1/1923 | Harzke | 29/259 |
| 1,451,852 | 4/1923 | Verdoorn | 29/259 |
| 1,743,825 | 1/1930 | Martens | 29/258 |

*Primary Examiner*—James L. Jones, Jr.

*Attorney, Agent, or Firm*—Kane, Dalsimer, Kane, Sullivan and Kurucz

[57] ABSTRACT

The disclosure is of an assembly and method for inserting and withdrawing the piston component of a disc brake assembly. The assembly comprises a base plate adapted to be secured to the brake assembly housing whereby a movable shaft, mounted on the base plate, is positioned above the piston and in axial alignment therewith. An endpiece on the shaft mates with the piston for holding it during insertion or withdrawal. Mechanical means is provided to move the shaft and consequently the held piston in or out of its cylinder. The assembly and method of the invention are advantageous in that they provide a means of insertion and withdrawal of the piston component with little potential for damage to the piston or cylinder components of the brake assembly.

9 Claims, 8 Drawing Figures

ASSEMBLY AND METHOD FOR DRIVING AND WITHDRAWING DISC BRAKE PISTON

BACKGROUND OF THE INVENTION

1. Field of the Invention

The invention relates to methods and apparatus for placement and removal of pistons in cylinders and more particularly relates to an assembly and method for insertion and withdrawal of the piston component of a disc brake assembly.

2. Brief Description of the Prior Art

Prior hereto, the most commonly employed method of withdrawing the piston component of the conventional disc brake assembly has comprised disassembly of the caliper halves followed by introduction of compressed air into the brake line. Under the pressure of compressed air the pistons are generally projected with great acceleration out of their cylinders. On occasion even highly compressed air will not move a frozen piston out of the cylinder and it must be levered out with a chisel or like tool; see Basic Auto Repair Manual, 7th Revised Edition (1975), Edited by S. Murray, Peterson Pub. Co., Los Angeles, Calif., (Library of Congress Card No. 75-18057), Page 278. In either event there is a likelihood of damage to the piston and/or the cylinder during the withdrawal procedure. The piston as a projectile powered by compressed air is subject to damage as it strikes some object (usually the brake housing) and may even be a safety hazard to the operator. Rotation and levering of the piston in the cylinder likewise may damage the piston and/or the cylinder walls.

Also prior to my invention, special wrenches have been provided for gripping the piston component of disc brake assemblies. However, like the employment of a chisel these wrenches operate on the principle of rotating and levering the piston out of its cylinder, thereby potentially damaging the piston and/or cylinder. Prior to my invention, no convenient tools have been available for the manual insertion of pistons into the cylinder of a disc brake assembly. The most common practice heretofore has been to hammer the piston in place; see Basic Auto Repair, supra. This practice is undesirable since it may damage or weaken the piston.

By the method and assembly of my invention, the piston component of a disc brake assembly may be inserted or withdrawn with little potential for damage to the piston or its cylinder and without hazard to the operator. The assembly permits a straight, in-line withdrawal of the piston, reducing the likelihood of damage.

SUMMARY OF THE INVENTION

The invention comprises an assembly for manually inserting and for withdrawing a piston component of a disc brake assembly, which comprises; a base plate; a shaft movably mounted on said base plate so as to be movable along the longitudinal axis of said shaft; means associated with said shaft for moving said shaft along its longitudinal axis; means attached to said base plate for releasably mounting said base plate to the housing of said brake assembly so one end of said shaft is positioned over the piston cylinder and in axial alignment therewith; and an endpiece connected to said end, said endpiece being adapted to engage with said piston and to hold it in axial alignment with the cylinder of said brake housing, during insertion and withdrawal of said piston component.

The term "manually" as used throughout the specification and the claims means a procedure requiring the use of human hands. For example, the use of a hand held screwdriver to insert a screw is a manual procedure.

DETAILED DESCRIPTION OF THE PREFERRED EMBODIMENTS OF THE INVENTION

A full and convenient understanding of the invention may be obtained by a reading of the following description in conjunction with the accompanying drawings of FIGS. 1–8, inclusive.

Figure 1:
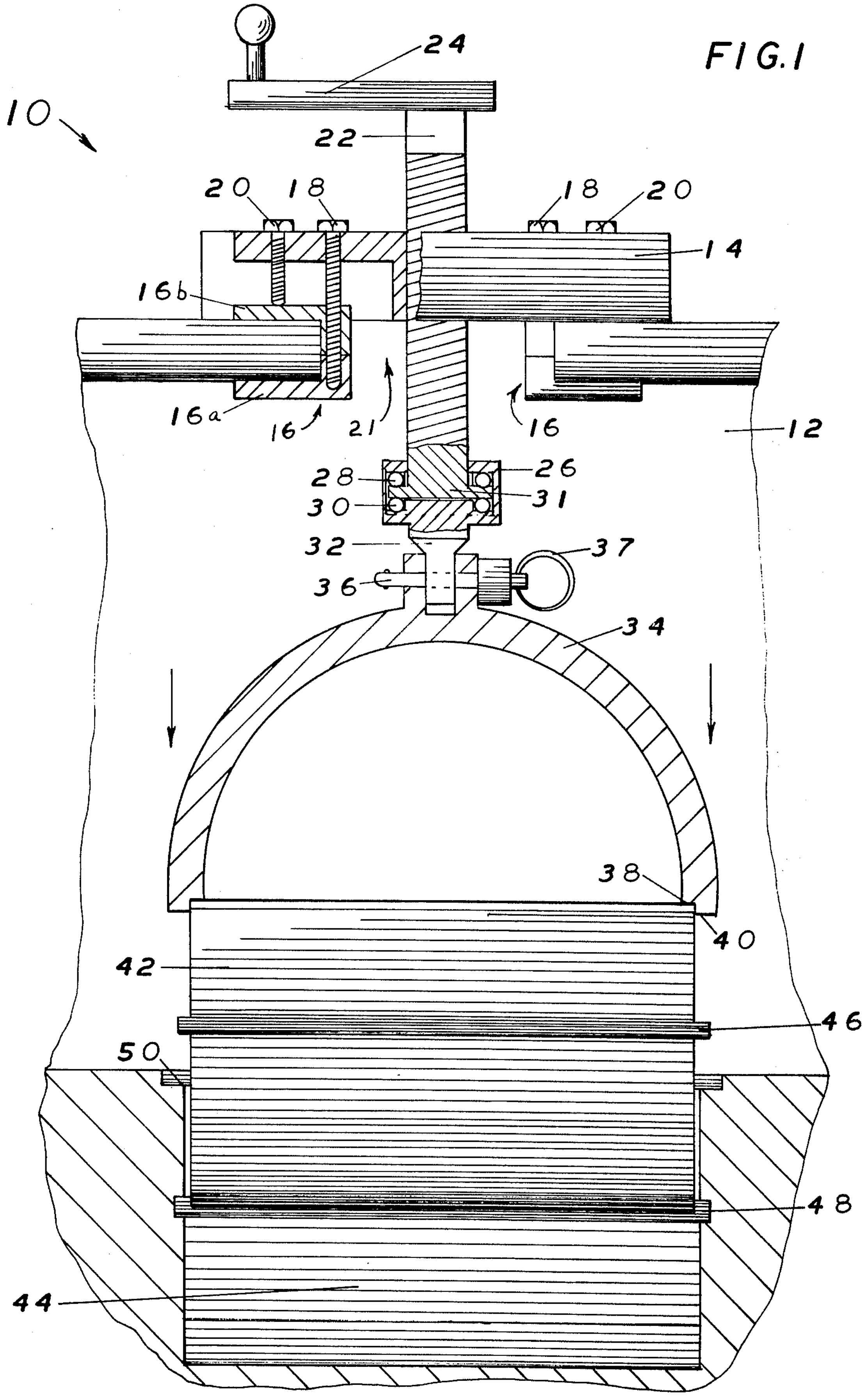
FIG. 1 is a cross-sectional-in-part side elevation of an embodiment assembly of the invention, shown mounted on a disc brake assembly and engaged with the piston component thereof.

Referring first to FIG. 1, a cross-sectional-in-part side elevation of a preferred embodiment assembly 10 may be seen. Assembly 10 is shown demountably mounted on a conventional disc brake assembly housing 12. The assembly 10 comprises a base plate 14, removably attached to housing 12 by right and left clamps 16. The clamps 16 comprise a lower L member **16*a* and an upper L member 16*b*. The members 16*a* and 16*b* cooperate and are held together by adjusting screw 18 which permits adjusting of the space between members 16*a* and 16*b* so that clamps 16 may accommodate and attach to brake housings 12 of varying thickness. Screw 20 secures the upper member 16*b* (and thereby clamp 16) to base plate 14. The arrangement of clamps 16 permits rapid mounting and dismounting of assembly 10 in a position upon housing 12 wherein screw member 22 is positioned above the piston and cylinder components of a disc brake assembly. The clamps 16 and screws 18,20 preferably upon loosening may be moved laterally in respect to base plate 14 so that they will adjust to accommodate any size opening 21 in housing 12**.

Base plate 14 has a threaded aperture therethrough (not seen in FIG. 1) in which there is threadedly engaged screw 22. A handle 24 is connected to the upper end of screw 22 to facilitate rotating screw 22, thereby moving it up and down in relation to the base plate 14. A disc 31 is formed on the lower end of screw 22 and is journaled on upper bearing surface 28 and lower bearing surface 30, the bearing surfaces 28, 30 being held in stationary bearing cage 26. The cage 26 together with bearings 28, 30 and disc 31 is a coupling between screw 22 and connecting shaft 32, which permits shaft 32 to not rotate when screw 22 is being rotated by handle 24. The connecting shaft 32 is attached to an endpiece 34 by shackle pin 36 inserted through apertures on endpiece 34 and connecting shaft 32. A finger grasping ring 37 on shackle pin 36 permits its removal when it is desired to change endpiece 34 as will be described hereinafter in greater detail.

As shown in FIG. 1, the assembly 10 is mounted in a position directly above the piston cylinder 44 of housing 12. The screw 22 and endpiece 34 are in axial alignment with the center of cylinder 44. As shown in FIG. 1, a piston component 42 is being inserted into piston cylinder 44. This is carried out according to the method of the invention by inserting the upper surface of the piston 42 into mating recess 38 of endpiece 34. The piston 42 is thus held in position in recess 38 and between flange 40 of the endpiece 34. After initially inserting piston 42 into piston cylinder 44, screw 22 is rotated so as to move screw 22 downward towards the piston cylinder 44. While holding the piston 42 in perfect axial alignment with piston cylinder 44, the endpiece 34 bearing upon the upper surface of piston 42 forces it into the piston cylinder 44 so that it recesses and aligns with recess 50 of housing 12. In doing so, the gasket 46 surrounding periphery of piston 42 engages in gasket recess 48 of housing 12. In this manner, it is possible to insert piston 42 into a piston cylinder 44 while holding the piston 42 in perfect axial alignment so that there is little likelihood of damage to either the piston 42 or the piston cylinder 44. As the screw 22 is being rotated, coupling 26 absorbs the rotational torque so that endpiece 34 is held in a non-rotating position, so that the piston 42 does not rotate while it is being inserted. This also reduces the likelihood of damage to either piston 42 or piston cylinder 44.

Figure 2:
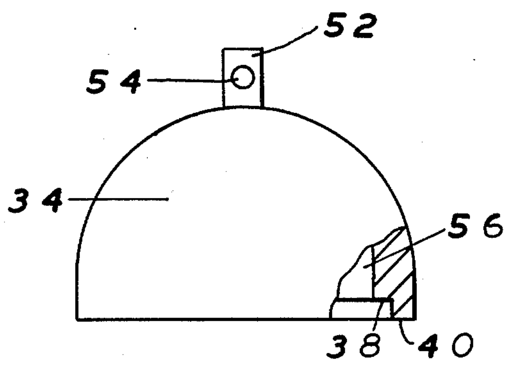
FIG. 2 is a cross-sectional-in-part side elevation of the component end-piece of the assembly shown in FIG. 1.

Referring now to FIG. 2, a cross-sectional-in-part side elevation of the component endpiece 34 of the assembly shown in FIG. 1, further details of the endpiece 34 may be observed. Thus, it will be seen that the endpiece 34 is fundamentally a hemisphere defining a space 56 although the endpiece 34 may be a solid part having only recess 38. At the upper center of the endpiece 34 is a tab 52 having an aperture 54 therein for attachment to the connecting shaft 32 as previously described. The recess 38 mates with the periphery of the upper end of piston 42 and permits the application of an even force on all points along said periphery, so the piston is inserted evenly without departing from the cylinder axis. Preferably, the mating engagement between endpiece 34 and piston 42 is a slight or light interference fit.

Figure 3:
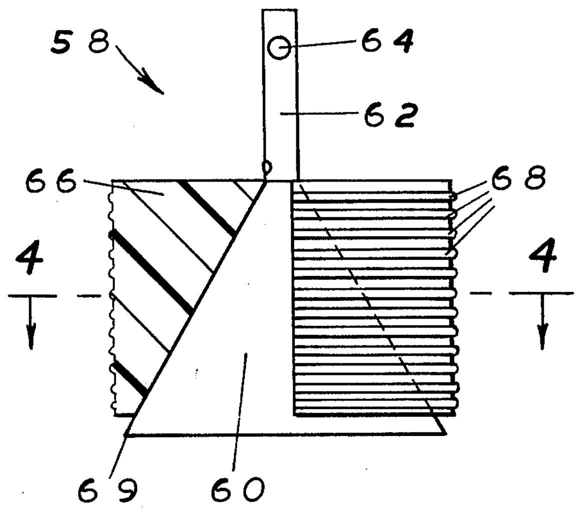
FIG. 3 is a cross-sectional-in-part side elevation of a preferred endpiece for the assembly shown in FIG. 1, particularly useful for withdrawal of a piston.
Figure 4:
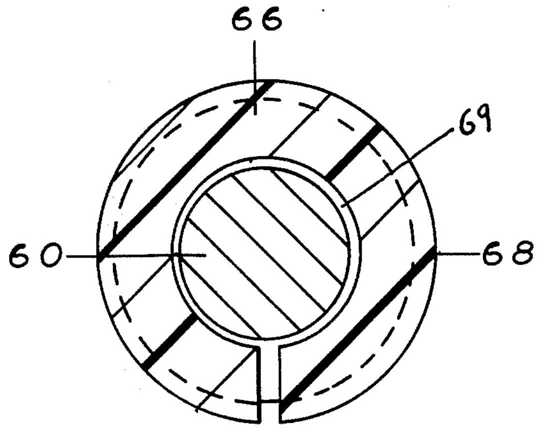
FIG. 4 is a cross-sectional view along lines 4—4 of FIG. 3.

FIG. 3 is a cross-sectional-in-part side elevation of a preferred endpiece 58, for the assembly shown in FIG. 1, particularly useful for withdrawal of a piston. The endpiece 58 comprises a non-elastic lower cone 60 and an upper shaft 62. Shaft 62 has an aperture 64 therein for connection to the connecting shaft 32 of assembly 10 via pin 36 and a detent 74. Substantially surrounding cone 60 is an elastomeric gripper 66. Elastomer gripper 66 is a cylindrical body and has a plurality of ribs 68 disposed radially about the periphery thereof for gripping the inside surface of a piston as will be described hereinafter. The body of gripper 66 is pierced by a cone-shaped bore 69, into which the cone 60 is received. The bore 69 is cone-shaped to mate with the configuration of cone 60. Further details of the structural relationship between cone 60 and gripper 66 may be seen in FIG. 4, a cross-sectional view along lines 4—4 of FIG. 3.

Figure 5:
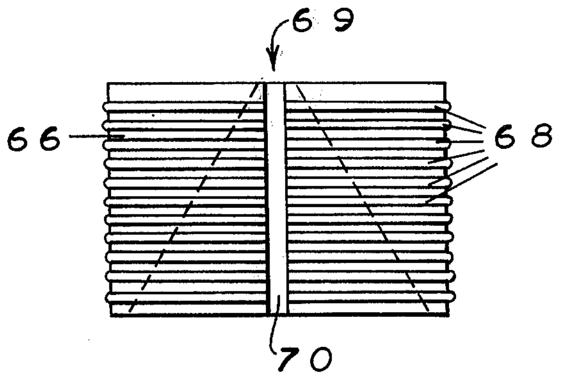
FIG. 5 is an isometric view of the piston gripping component shown in FIG. 3.

In FIG. 5, a preferred embodiment gripper 66 is shown having a split 70 in the sidewalls thereof to permit expansion laterally. This permits the gripper 66 to spread and increase substantially in diameter.

Figure 6:
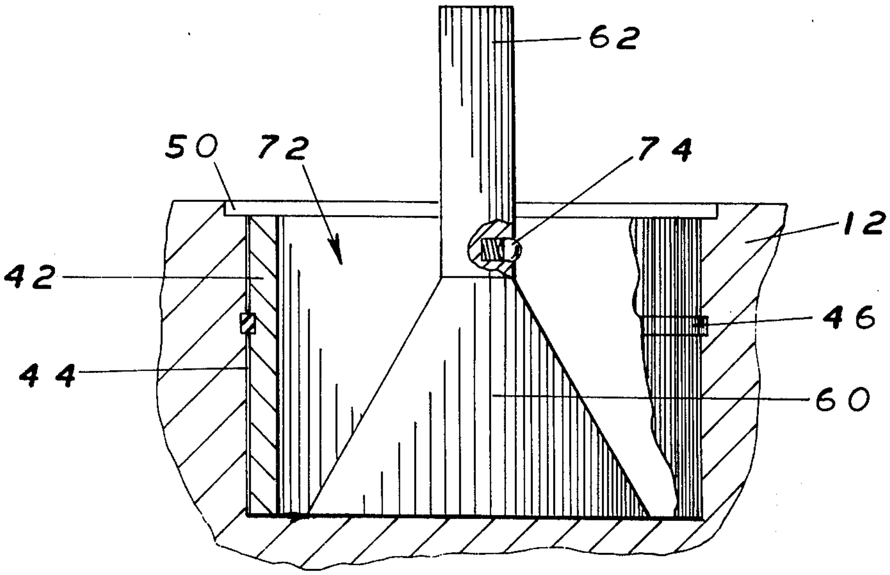
FIG. 6 is a cross-sectional-in-part side elevation of a part of the endpiece shown in FIG. 3, inserted in the piston component of a disc brake assembly.
Figure 7:
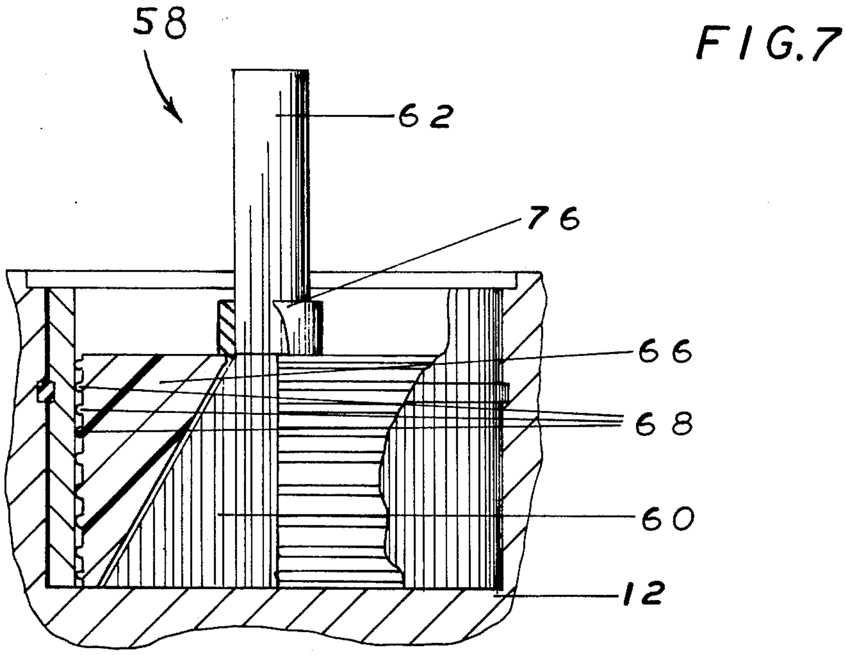
FIG. 7 is a cross-sectional-in-part side elevation of the complete endpiece of FIG. 3 shown engaging a piston in a disc brake assembly.
Figure 8:
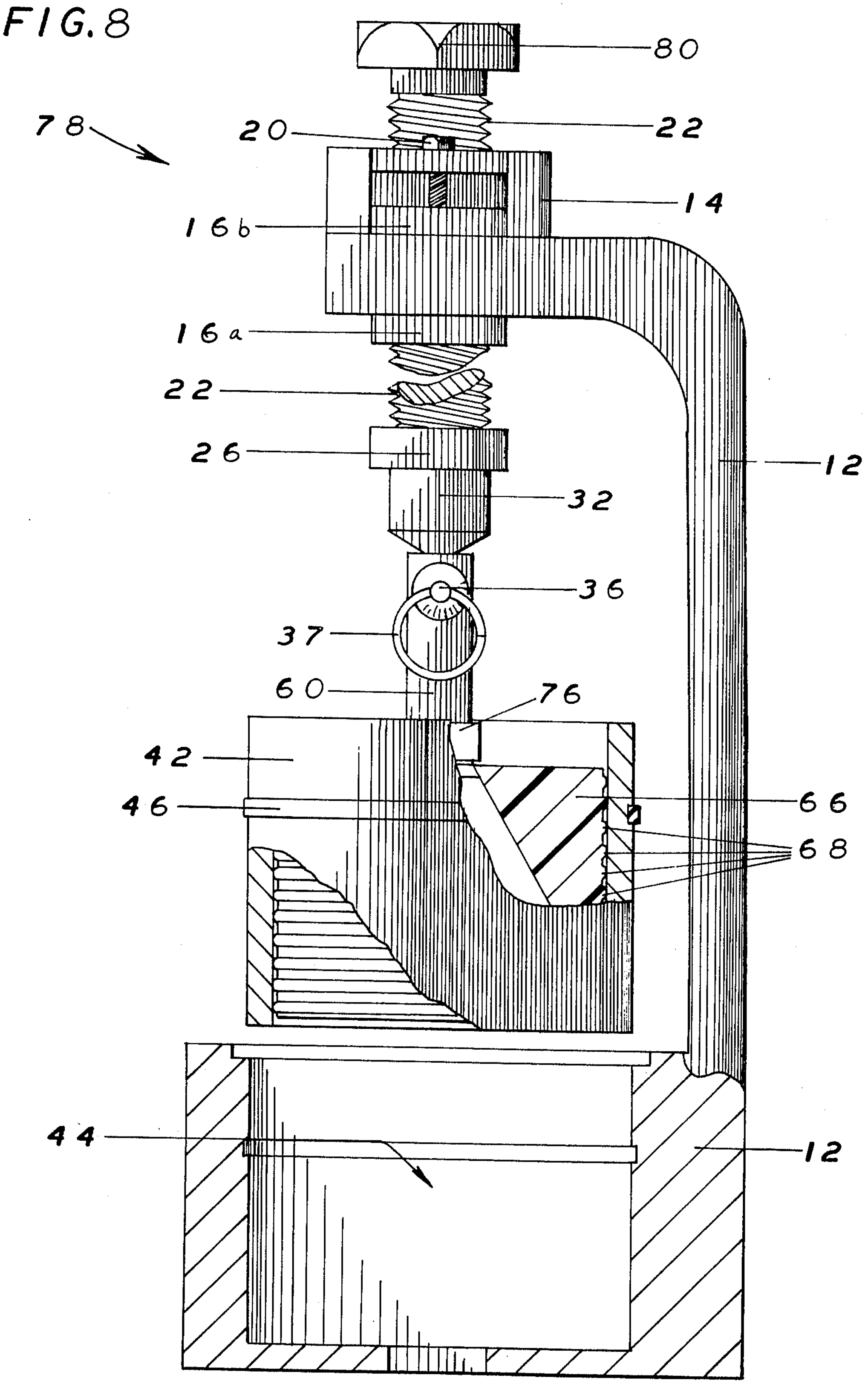
FIG. 8 is a cross-sectional-in-part side elevation of another embodiment assembly of the invention showing its mounting on a disc brake assembly and engagement with a piston component thereof.

The withdrawal of a piston 42 from a piston cylinder 44 employing endpiece 58 may be carried out as follows. First the assembly 10 is mounted over the piston cylinder 44 as described above in relation to FIG. 1. The cone 60, before attaching to connecting shaft 32 is positioned within the space 72 inside of piston 42 as shown in FIG. 6. Gripper 66 is then placed over cone 60 as shown in FIG. 7 and forced downward by retainer 76 so that gripper 66 expands along split 70 and the ribs 68 engage the inner walls of piston 42. Retainer 76 is held in place by detent 74 on shaft 62 so as to stress or load gripper 66 sufficiently to engage the inner walls of piston 42. The shaft 62 is then connected with shaft 32 of assembly 10. The screw 22 is then rotated so that screw 22 rises in its aperture in base plate 14 exerting an upward pulling force on endpiece 58, particularly on cone 60. Upward withdrawal of the cone component 60 of endpiece 58 within bore 69 of gripper 66 forces gripper 66 outwardly against the inner walls of piston 42, providing tight frictional engagement between piston 42 and ribs 68. The upward movement of cone 60 with gripper 66 in frictional engagement with the piston 42 effects withdrawal of the piston from cylinder 44. As shown in FIG. 8, the coupling 26 absorbs the torque of the rotating screw 22, preventing its transfer to the endpiece 58, thereby allowing withdrawal of the piston 42 without rotation thereof. This reduces the likelihood of damage to the piston 42 during its withdrawal. The steady and even withdrawal of piston 42 afforded by movement of screw 22 also minimizes potential for damage to piston 42 or cylinder 44. A particular advantage of the preferred endpiece 58 for withdrawal of a piston 42 resides in its ability to adapt to the pull required for piston 42 withdrawal. For example, if piston pulling requires minimal force, the pressure exerted by gripper 66 on the piston will be minimal. On the other hand, as the pulling force requirement increases because of the tight fit of piston 42 in cylinder 44, the cone shaped component 60 will cam over the surface of bore 69 of gripper 66 increasing the pressure of gripper 66 on the piston 42. This reduces the potential for gripper 66 losing its attachment to a difficult to move piston 42.

Another advantageous feature of the assembly 10 of the invention using the endpiece 58 resides in the direct and in-line pull upon piston 42. Since the piston 42 is pulled in a direct line, in alignment with the cylinder 44, there is little likelihood of damage to either piston 42 or cylinder 44 during withdrawal. When the piston 42 is free of the cylinder, there is no acceleration of the piston to be dampened.

The endpiece 58 may also be used to insert the piston 42 into cylinder 44 by merely reversing the procedure described above, i.e.; the gripper 66 is brought into engagement with the free piston 42 after mounting assembly 10 on the housing 12. The screw 22 is rotated to move it downward and the piston 42 is inserted and carried down into proper relationship with cylinder 44.

Refer now to FIG. 8, a cross-sectional-in-part side elevation of another embodiment assembly 78 of the invention, showing its mounting on a disc brake assembly 12 and in engagement with a piston component 42 thereof. In this figure, one can clearly see that the gripper 58 can also be employed for insertion of piston 42 into piston cylinder 44. Thus, by inserting cone 60 and stressing gripper 66 downward sufficient holding power is exerted on the piston 42 to permit its insertion into the piston cylinder 44. In the embodiment of FIG. 8, a wrench fitting head 80 is provided as a substitute for handle 24 so that the screw 22 may be raised or lowered with the assistance of a wrench or power tool.

Although the invention has been described above with reference to certain embodiments thereof for the purpose of simplicity and description, it should be understood that this invention is in no sense limited thereby and the scope of the invention is to be determined only by that of the appended claims. Many other variations of the invention will be obvious to those skilled in the art, for example, the devices of the invention may be provided in any size and any shape. Also, as a further example, the coupling 26 may have a single layer of upper bearings 28, the bearing layer 30 being optional. The assemblies 10 and 78 may also have permanently connected endpiece 34 or 58 rather than interchangeable options. The assemblies 10 and 78 may be fabricated of any conventional materials, preferably tool steel and the elastomeric gripper 66 may be fabricated from any other conventional frictional material such as metal, polymeric resin, rubber and like materials. Those skilled in the art will also appreciate the other means of moving the endpiece 34 or 58 up and down in relation to base plate 14 may be employed. However, the screw 22 component shown in the preferred embodiments is particularly advantageous since it provides control of movement, speed and direction and permits one to test for alignment of the assembly 10 over a piston or piston cylinder before exerting force upon the piston. The use of a screw 22 component is also a simple construction, requiring minimal maintenance and likelihood of malfunction.

I claim:

1. An assembly for manually inserting and for withdrawing a piston component of a disc brake assembly, which comprises;

- a base plate;
- a shaft movably mounted on said base plate so as to be movable along the longitudinal axis of said shaft;
- means associated with said shaft for moving said shaft along its longitudinal axis;
- means attached to said base plate for releasably mounting said base plate to the housing of said brake assembly so one end of said shaft is positioned over the piston cylinder and in axial alignment therewith; and
- an endpiece connected to said end, said endpiece being adapted to engage with said piston and to hold it in axial alignment with the cylinder of said brake housing, during insertion or withdrawal of said piston component.

2. An assembly for inserting and for withdrawing a piston component of a disc brake assembly, which comprises;

- a base plate having a threaded aperture therethrough;
- a screw movably mounted in said aperture, said screw having an upper end and a lower end;
- a handle on said upper end for rotating said screw, thereby causing said screw to move up and down in said aperture in relation to said base plate;
- means attached to said base plate for releasably mounting said base plate to the housing of said brake assembly so as to position the lower end of said screw over the piston cylinder of said brake assembly whereby said screw is in axial alignment with the center of said cylinder;
- an endpiece connected to the lower end of said screw, the lower end of said endpiece being adapted to engage with and to hold the piston component of said brake assembly in axial alignment with said cylinder when said assembly is mounted on the housing as described above; and
- a coupling connecting the lower end of said screw to the upper end of said endpiece, said coupling being adapted to absorb rotational torque transmitted by said screw when rotated, whereby the endpiece when engaged with said piston will not rotate upon rotation of said screw.

3. An assembly according to claim 2 which additionally comprises a connecting shaft between said coupling and said endpiece.

4. An assembly according to claim 2 wherein said means for releasably mounting said base plate to said housing comprises a clamp.

5. An assembly according to claim 2 wherein said coupling comprises a bearing cage and bearing surfaces upon which the lower end of said screw is journaled.

6. An assembly according to claim 2 wherein the connection between said coupling and said endpiece is removable.

7. An assembly according to claim 2 wherein said endpiece comprises a cylindrical body, the lower end of which bears a recess around the periphery thereof, said recess being of a dimension to receive and mate with the upper end of said piston, the outer periphery of said recess being defined by a flange integral with the body of said cylinder.

8. An assembly according to claim 2 wherein said endpiece comprises;

- a first cylindrical, elastic body having a top end, a bottom end and a bore therethrough communicating between said top and bottom ends, said bore tapering from a larger diameter at the bottom end to a smaller diameter at the top end so that said bore has a frusto-conical shape;
- a second cylindrical, non-elastic body having a frusto-conical base of a size and configuration to be received in and mate with said bore and a smaller diameter shaft at the apex, said shaft being adapted for connection with said coupling; and
- means for caming said first body downward over the base of said second body, whereby said first body is elastically expanded in diameter.

9. An assembly according to claim 8 wherein said means is a movable sleeve over said shaft at the apex, said sleeve being fixable in position on said shaft at the apex by engagement with a detent on said shaft at the apex.

* * * * *